US012173744B2

(12) United States Patent
Lin

(10) Patent No.: US 12,173,744 B2
(45) Date of Patent: Dec. 24, 2024

(54) THUMB SCREW

(71) Applicant: ACCTON TECHNOLOGY CORPORATION, Hsinchu (TW)

(72) Inventor: Jyun-Fu Lin, Hsinchu County (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 189 days.

(21) Appl. No.: 18/090,694

(22) Filed: Dec. 29, 2022

(65) Prior Publication Data

US 2024/0026919 A1  Jan. 25, 2024

(30) Foreign Application Priority Data

Jul. 20, 2022 (CN) .......................... 202221878451.1

(51) Int. Cl.
| F16B 23/00 | (2006.01) |
| F16B 5/02 | (2006.01) |
| F16B 35/04 | (2006.01) |
| F16B 39/28 | (2006.01) |

(52) U.S. Cl.
CPC .............. F16B 39/28 (2013.01); F16B 35/04 (2013.01)

(58) Field of Classification Search
CPC ......... F16B 23/00; F16B 37/16; F16B 5/0208
USPC .................................. 411/402, 408, 409, 435
See application file for complete search history.

(56) References Cited

U.S. PATENT DOCUMENTS

| 1,670,219 | A | * | 5/1928 | Smith | .................... E03C 1/0401 |
| | | | | | 285/193 |
| 2,660,083 | A | * | 11/1953 | Tyson | ................. F16B 13/0808 |
| | | | | | 411/402 |
| 4,526,071 | A | * | 7/1985 | Post | ...................... B25B 23/106 |
| | | | | | 411/407 |
| 5,544,992 | A | * | 8/1996 | Ciobanu | ............... F16B 5/0208 |
| | | | | | 411/375 |
| 6,669,423 | B2 | * | 12/2003 | Smith | ..................... G06F 1/183 |
| | | | | | 411/408 |
| 8,393,841 | B1 | * | 3/2013 | Angeloni | ................ F16B 35/06 |
| | | | | | 411/383 |
| 9,963,190 | B1 | * | 5/2018 | Liu | ........................ F16B 7/0426 |
| 10,267,349 | B2 | * | 4/2019 | Apostolopoulos | ....... F16B 37/12 |
| 11,261,901 | B2 | * | 3/2022 | Yen | ......................... F16B 35/06 |
| 11,421,725 | B2 | * | 8/2022 | Chiang | ................. F16B 5/0208 |
| 2021/0131471 | A1 | * | 5/2021 | Wang | .................... F16B 5/0208 |

* cited by examiner

Primary Examiner — Flemming Saether
(74) Attorney, Agent, or Firm — Birch, Stewart, Kolasch & Birch, LLP

(57) ABSTRACT

A thumb screw includes a main body and a rotating member. The main body has a shank and a threaded portion which are connected together along an axis of the main body. The shank has a groove and two guiding holes respectively located on two opposite sides of the groove and communicating with the groove. The rotating member has a head, a rod connected to an end surface of the head, and two pin portions connected to the rod. The head has two receiving grooves adapted to receive two partial end portions of the shank. When the two partial end portions leave the two receiving grooves and the two pin portions are respectively located in the two guiding holes, the rotating member could pivot around the two pin portions relative to the main body, thereby allowing the thumb screw to be received.

15 Claims, 9 Drawing Sheets

THUMB SCREW

BACKGROUND OF THE INVENTION

Technical Field

The present disclosure relates generally to a fixing unit, and more particularly to a thumb screw.

Description of Related Art

Conventional thumb screws have a head with a large diameter, wherein a peripheral surface of the head has an anti-slip protruding thread. When using the conventional thumb screw, a user only needs to turn the head of the thumb screw with the thumb and the forefinger to fix the thumb screw at a workpiece.

Some workpieces applying the thumb screw require the thumb screw to have a long shank. For example, a screw hole of the workpiece is located at a bottom of a recessing groove of the workpiece, and only the thumb screw having the long shank could allow at least a part of the head of the thumb screw to remain out of the recessing groove when the thumb screw is turned to a destinated position, so as to ensure that the thumb screw could be manipulated by the user.

In the aforementioned circumstance, if the head of the thumb screw could be received in the recessing groove when the thumb screw is turned to the destinated position, an appearance of the workpiece would be tidy and beautiful, and the thumb screw would not be easily collided by external objects.

BRIEF SUMMARY OF THE INVENTION

In view of the above, the primary objective of the present disclosure is to provide a thumb screw having a main body and a rotating member, and the rotating member could be operated by fingers of a user to turn the thumb screw to engage the thumb screw with a screw hole of a workpiece. The rotating member could be bent relative to the main body to reduce a length of the thumb screw in an axial direction of the main body, so that when the thumb screw is applied to the workpiece with the aforementioned structure, an appearance of the workpiece could keep tidy, and the thumb screw would not be easily collided by external objects.

The present disclosure provides a thumb screw, wherein the main body of the thumb screw has a shank and a threaded portion which are connected together along an axis of the main body. The shank has a groove and a pair of guiding holes, wherein the groove opens at an end portion of the shank and divides the end portion into two partial end portions. The two guiding holes are respectively located on two sides of the groove and communicate with the groove. The rotating member of the thumb screw has a head, a rod connected to an end surface of the head, and two pin portions connected to the rod. The head has two receiving grooves respectively located on two sides of the rod. The rod is disposed in the groove and reciprocates along the groove. When the rod is located at a predetermined position in the groove, the two partial end portions are respectively received in the two receiving grooves. When the two pin portions are respectively located in the two guiding holes and the two partial end portions leave the two receiving grooves, the rotating member is pivotable around the two pin portions relative to the main body.

With the aforementioned design, through one pair of the guiding holes of the thumb screw, when the two pin portions are respectively located in the two guiding holes and the two partial end portions leave the two receiving grooves, the rotating member of the thumb screw could pivot around the two pin portions to bent relative to the main body to be received in the recessing groove of the workpiece.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
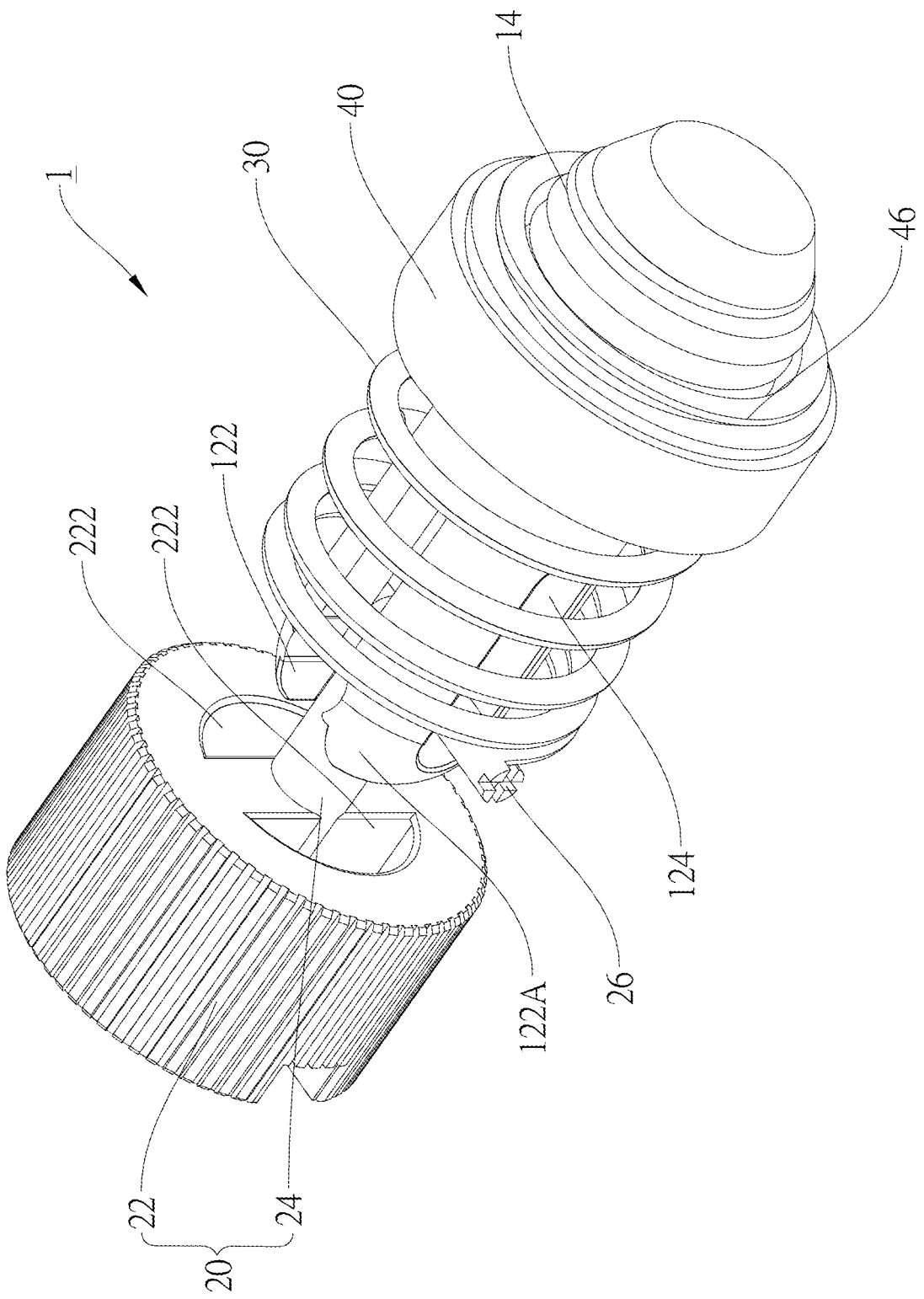
FIG. 1 is a perspective view of the thumb screw according to an embodiment of the present disclosure.
Figure 2:
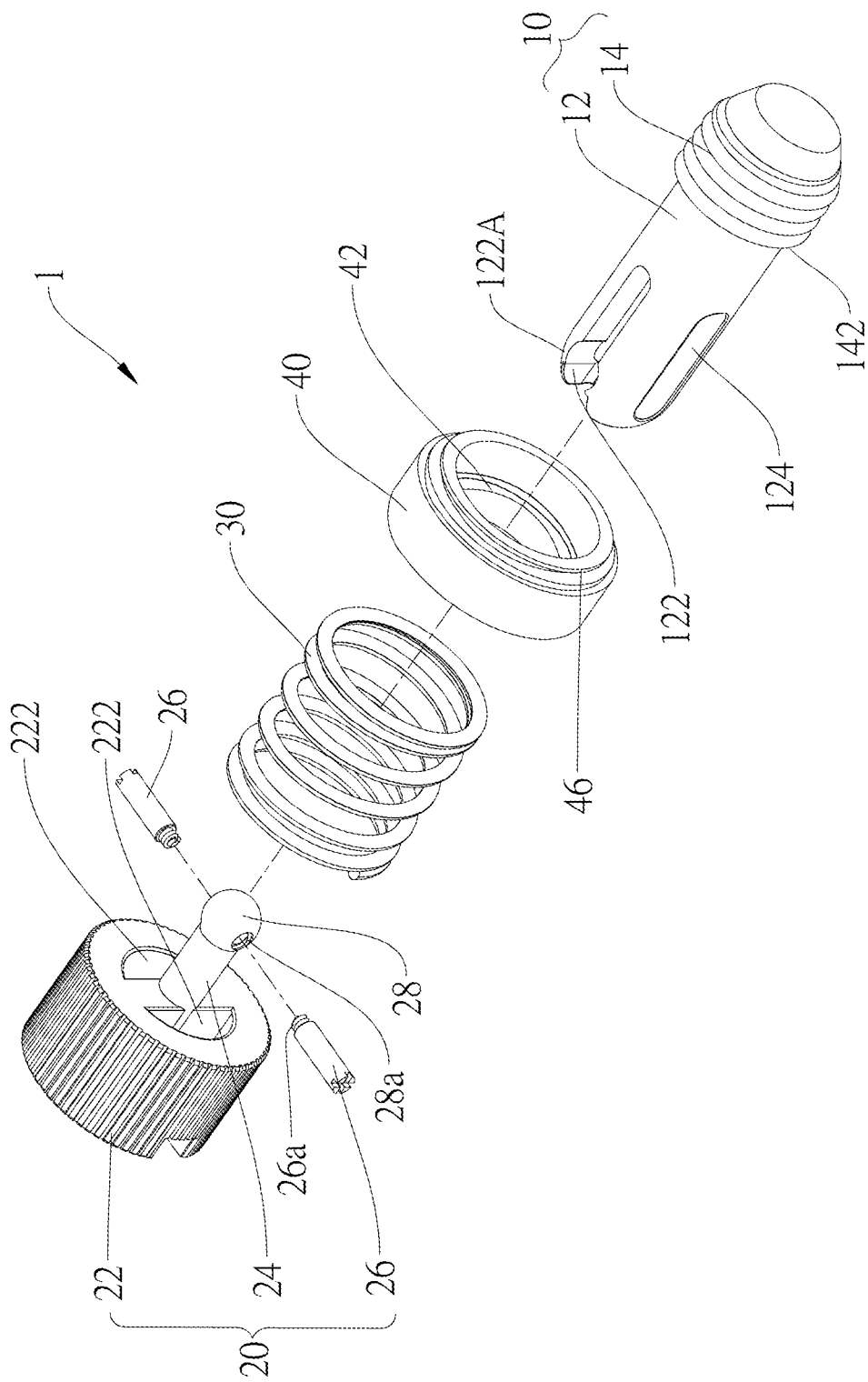
FIG. 2 is an exploded view of the thumb screw according to the embodiment of the present disclosure.
Figure 3:
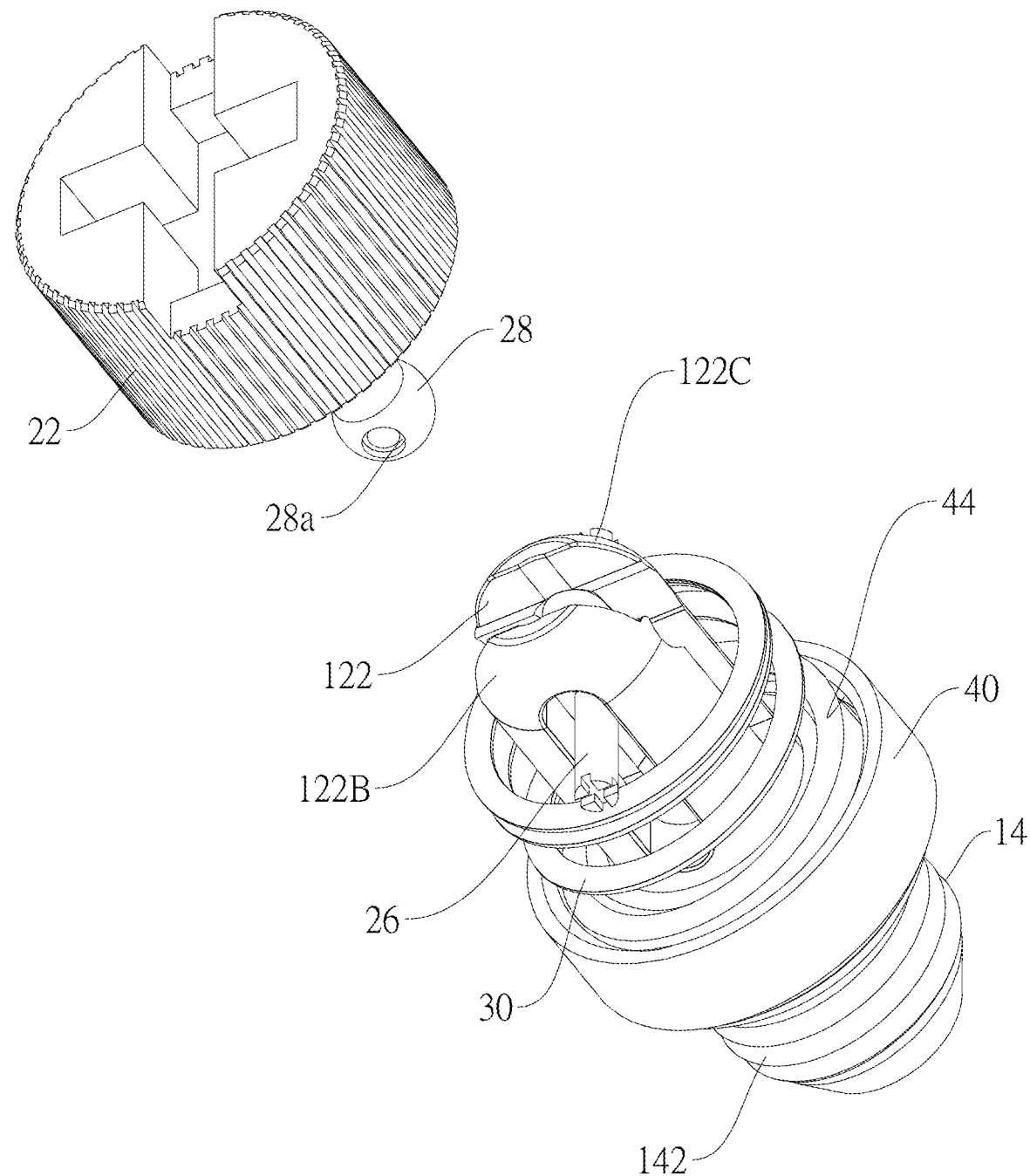
FIG. 3 is a partial exploded view of the thumb screw according to the embodiment of the present disclosure.

A thumb screw 1 according to an embodiment of the present disclosure is illustrated in FIG. 1 to FIG. 3 and includes a main body 10, a rotating member 20, a spring 30, and a fixing ring 40.

The main body 10 has a shank 12 and a threaded portion 14 which are connected together along an axis of the main body 10. The threaded portion 14 has an outer threaded section 142. The shank 12 has a groove 122 and a pair of guiding holes 124. In the current embodiment, the groove 122 opens at an end portion 122A of the shank 12 and divides the end portion 122A into two partial end portions 122B, 122C that are symmetric, and the two guiding holes 124 are respectively located on two sides of the groove 122 and communicate with the groove 122.

The rotating member 20 includes a head 22, a rod 24, and two pin portions 26, wherein the rod 24 is connected to an end surface of the head 22. The head 22 has two receiving grooves 222, and each of the receiving grooves 222 has an opening, wherein the openings of the two receiving grooves 222 are located on two sides of the rod 24 on the end surface of the head 22. The two pin portions 26 are connected to the rod 24 on two opposite sides on an axis perpendicular to the axis of the main body 10. In the current embodiment, an end of the rod 24 away from the head 22 forms a spherical head 28 that is a spherical shape, wherein two sides of the spherical head 28 respectively have a screw hole 28a, and each of the two pin portions 26 is a pin rod with an end having a threaded section 26a, thereby each of the two threaded sections 26a is engaged with one of the two screw holes 28a of the spherical head 28. However, the structural relationship between the two pin portions 26 and the rod 24 is not limited to the aforementioned structure. In other embodiments, a through hole of the rod 24 could be penetrated through by a pin rod, and two opposite ends of the pin rod respectively form a pin portion 26 on two sides of the rod 24. All equivalent structures which form the two pin portions 26 on the rod 24 should fall within the scope of the present disclosure.

At least a part of the rod 24 of the rotating member 20 is located in the groove 122 of the main body 10. The two pin portions 26 are respectively located in the two guiding holes 124, and the threaded section 26a of each of the two pin portions 26 is engaged with one of the two the screw holes 28a of the rod 24, wherein the spherical head 28 is the spherical shape to facilitate the rotating member 20 to rotate, and the two pin portions 26 could prevent the rotating member 20 from detaching from the main body 10.

Figure 7:
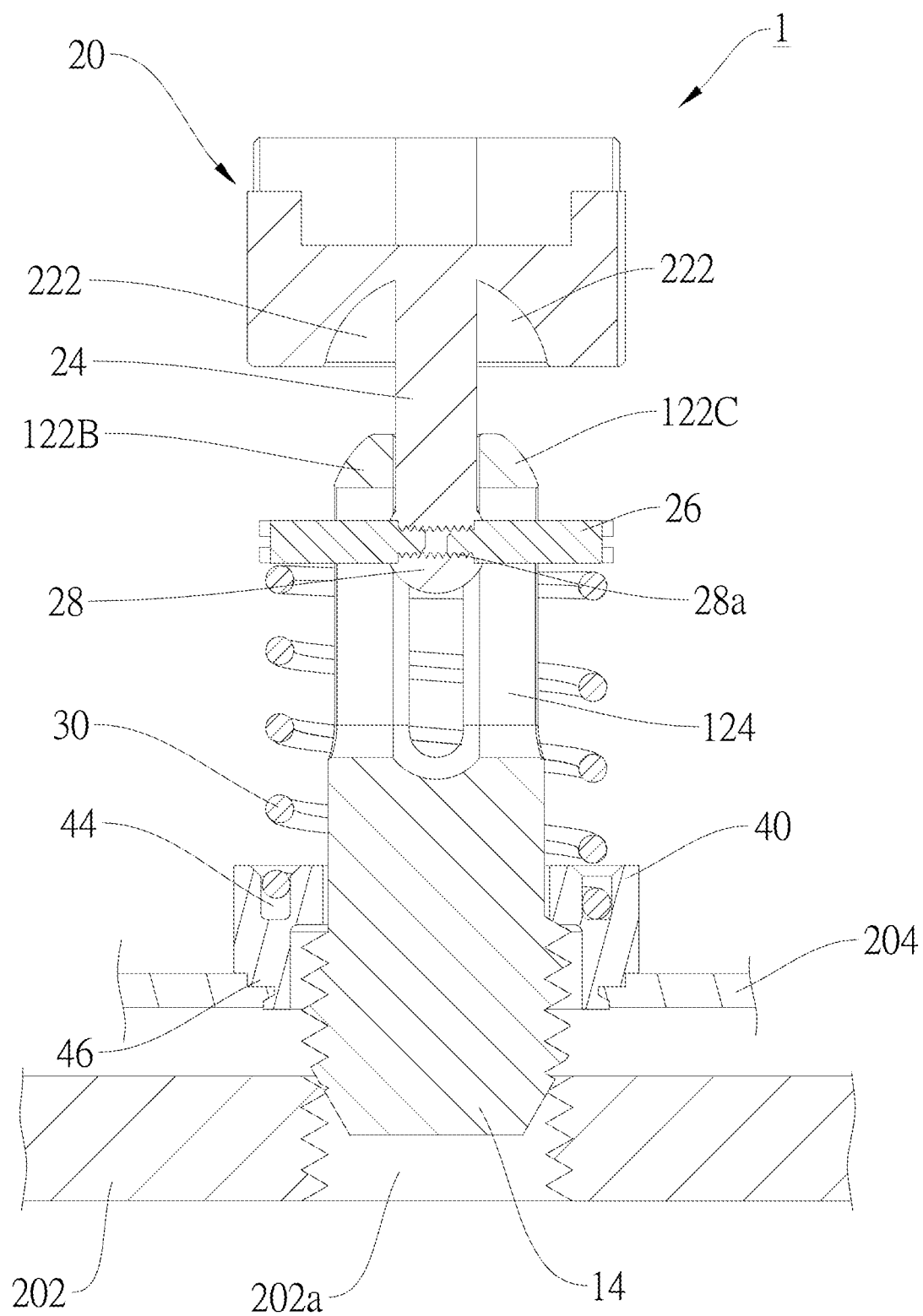
FIG. 7 is a sectional view along the 7-7 line in FIG. 5.

The fixing ring 40 has a through hole 42. The through hole 42 of the fixing ring 40 fits around the shank 12 of the main body 10, thereby positioning the fixing ring 40 between the rotating member 20 and the threaded portion 14. Besides, a diameter of the through hole 42 of the fixing ring 40 is smaller than an outer diameter of the threaded portion 14, and an end of the fixing ring 40 abuts against a thread of the outer threaded section 142, so that the fixing ring 40 could not detach from the main body 10 via the threaded portion 14 along the axis of the main body 10. Moreover, as shown in FIG. 7, the fixing ring 40 has an annular positioning groove 44.

The spring 30 fits around the main body 10. Two ends of the spring 30 respectively abut against the two pin portions 26 and the fixing ring 40, wherein the end of the spring 30 closer to the fixing ring 40 is received in the annular positioning groove 44, thereby restricting a position of the end of the spring 30 closer to the fixing ring 40. In the current embodiment, an inner diameter of the spring 30 is larger than the outer diameter of the threaded portion 14. However, in other embodiments, the inner diameter of the spring could be smaller than the outer diameter of the threaded portion 14, and two opposite ends of the spring 30 respectively abut against the two pin portions 26 and an end of the threaded portion 14 facing towards the rotating member 20.

The description above illustrates the structure and the location of each part of the thumb screw 1. The description below illustrates the use and the effect of the thumb screw 1.

Figure 4:
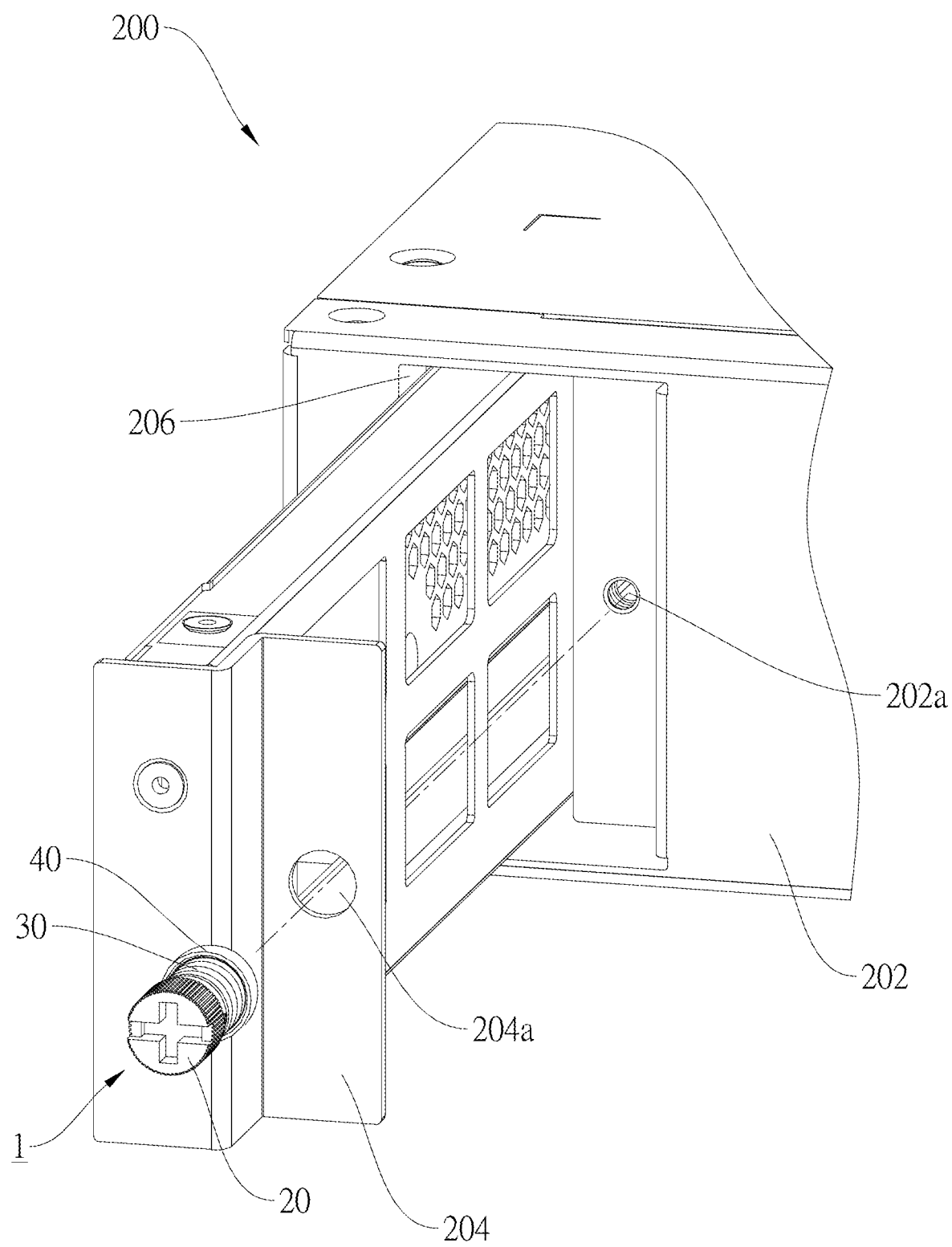
FIGS. 4-6 are respectively a schematic view of the thumb screw according to the embodiment of the present disclosure, showing the use of the thumb screw.

As shown in FIG. 4, the thumb screw 1 according to the current embodiment of the present disclosure is engaged with an object which is a case 200 of an electronic device as an example, wherein the case 200 of the electronic device includes a case body 202, a circuit board rack 204 adapted to dispose a circuit module, and a receiving room 206 formed in the case body 202 for the circuit board rack 204 to be inserted into or withdrawn from. When the circuit board rack 204 is inserted into the receiving room 206, the circuit module could be connected to a main circuit of the electronic device.

Figure 5:
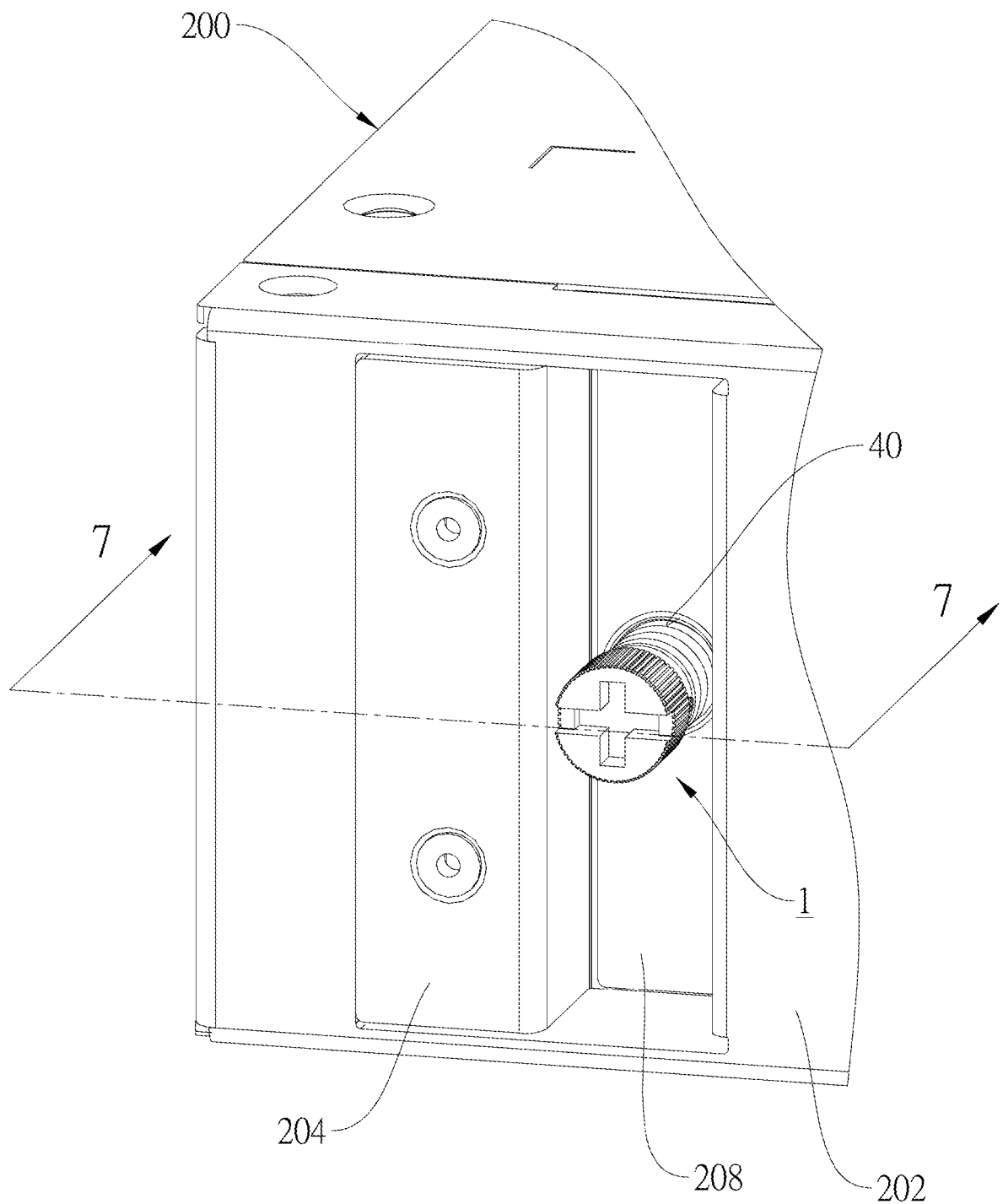

Referring to FIG. 2, FIG. 4, and FIG. 5, in order to fix the circuit board rack 204 at the case body 202, the circuit board rack 204 has an engaging hole 204a adapted to be engaged with the fixing ring 40 of the thumb screw 1, wherein an outer peripheral wall of the fixing ring 40 has an engaging portion 46 disposed around the outer peripheral wall of the fixing ring 40 to be engaged with the engaging hole 204a. Referring to FIG. 7, in the current embodiment, the engaging portion 46 is, but not limited to, a recessing groove, thereby the thumb screw 1 could be disposed on the circuit board rack 204 under a normal condition. A position of the case body 202 corresponding to the engaging hole 204a has a screw hole 202a adapted to be engaged with the threaded portion 14 of the thumb screw 1 to fix the circuit board rack 204 on the case body 202 when the circuit board rack 204 is inserted into the receiving room 206.

A status that the threaded portion 14 of the thumb screw 1 has not been engaged with the screw hole 202a of the case body 202 is illustrated in FIG. 5 and FIG. 7, wherein under the circumstance that the rotating member 20 is not pressed by an external force, an elastic force of the spring 30 urges the two pin portions 26 to move towards the head 22 along the axis of the main body 10, making the receiving groove 222 of the rotating member 20 locate above the main body 10.

Figure 6:
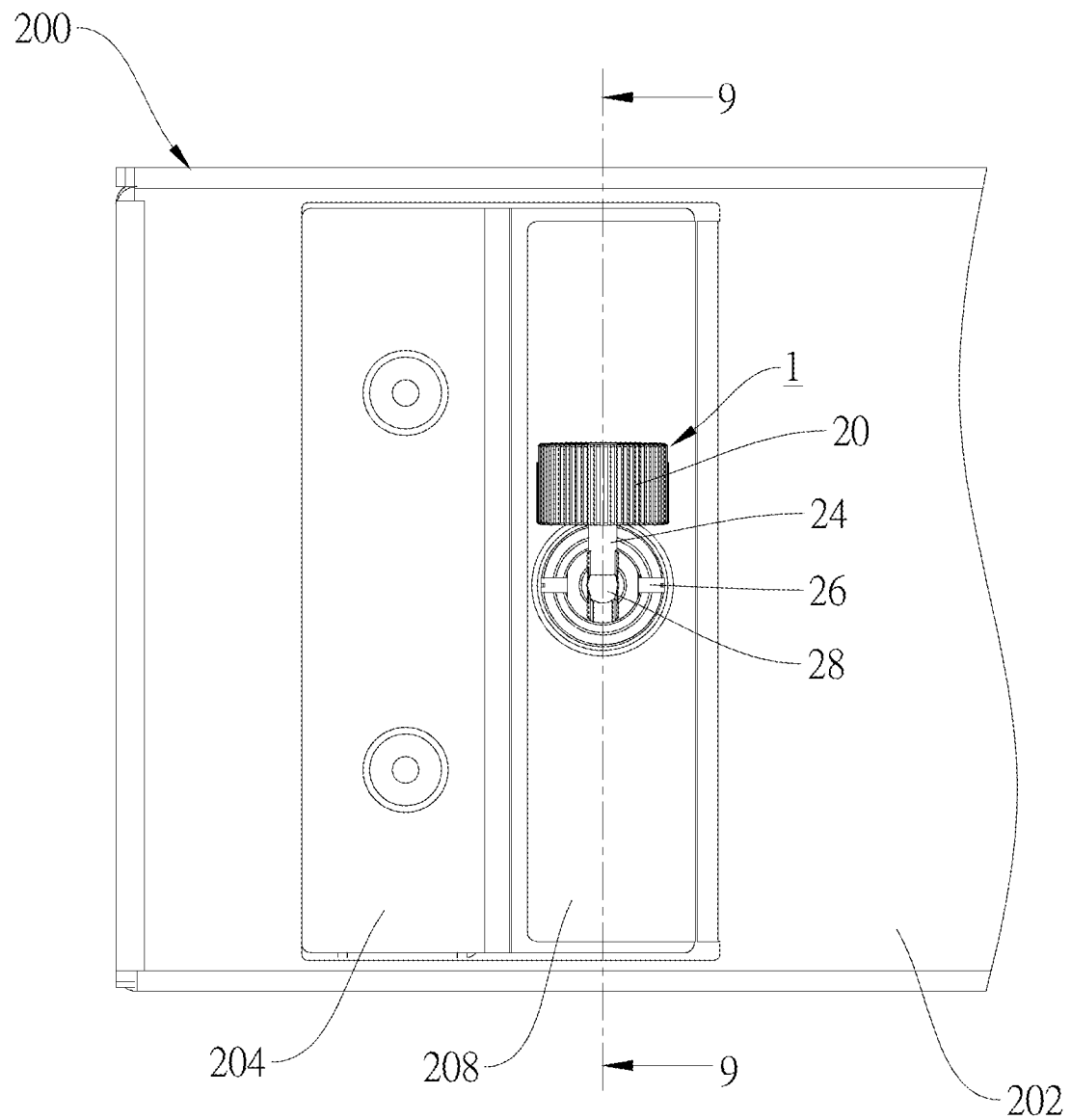
Figure 8:
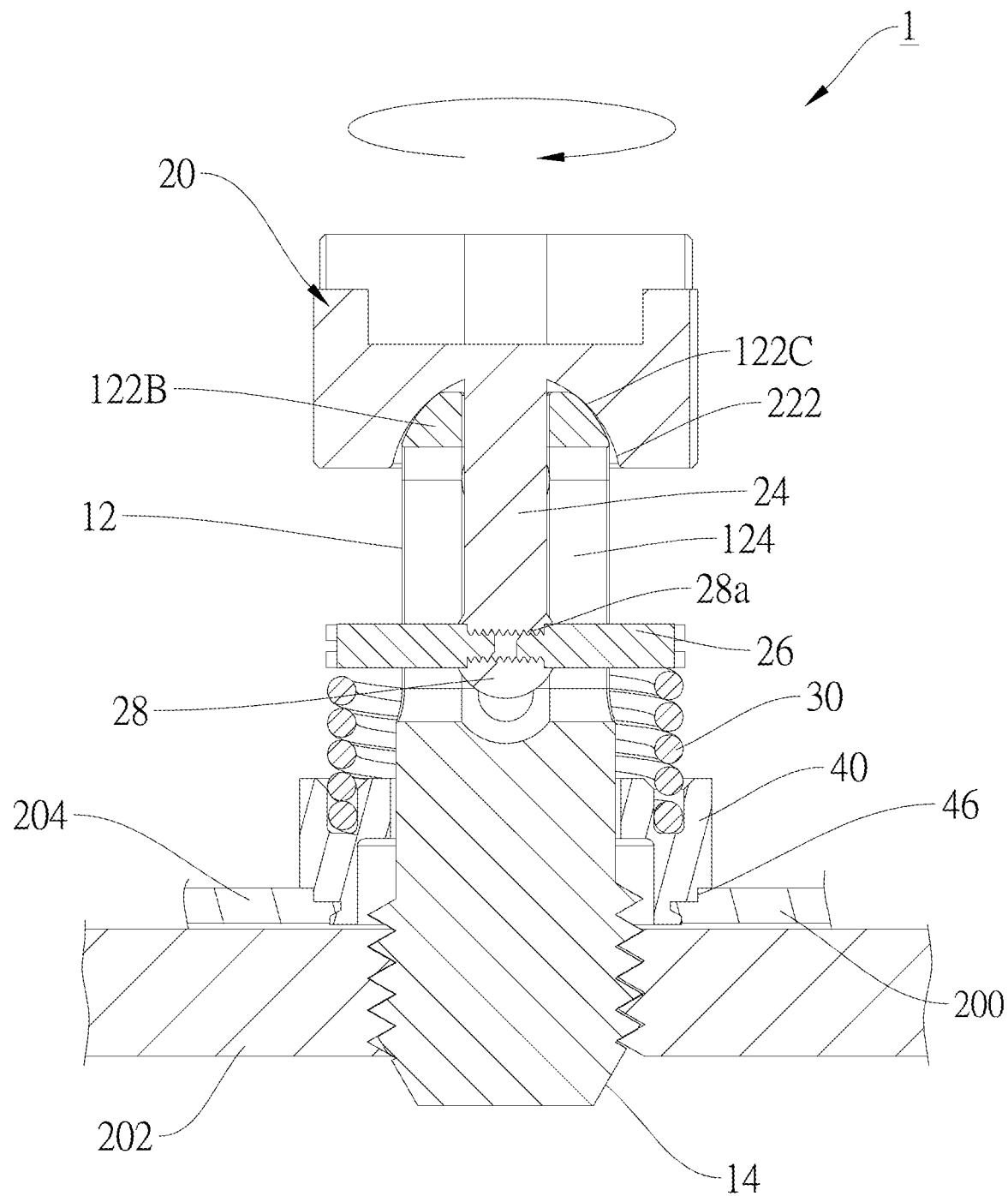
FIG. 8 is similar to FIG. 7, showing the thumb screw is engaging with the screw hole of the case of the electronic device.
Figure 9:
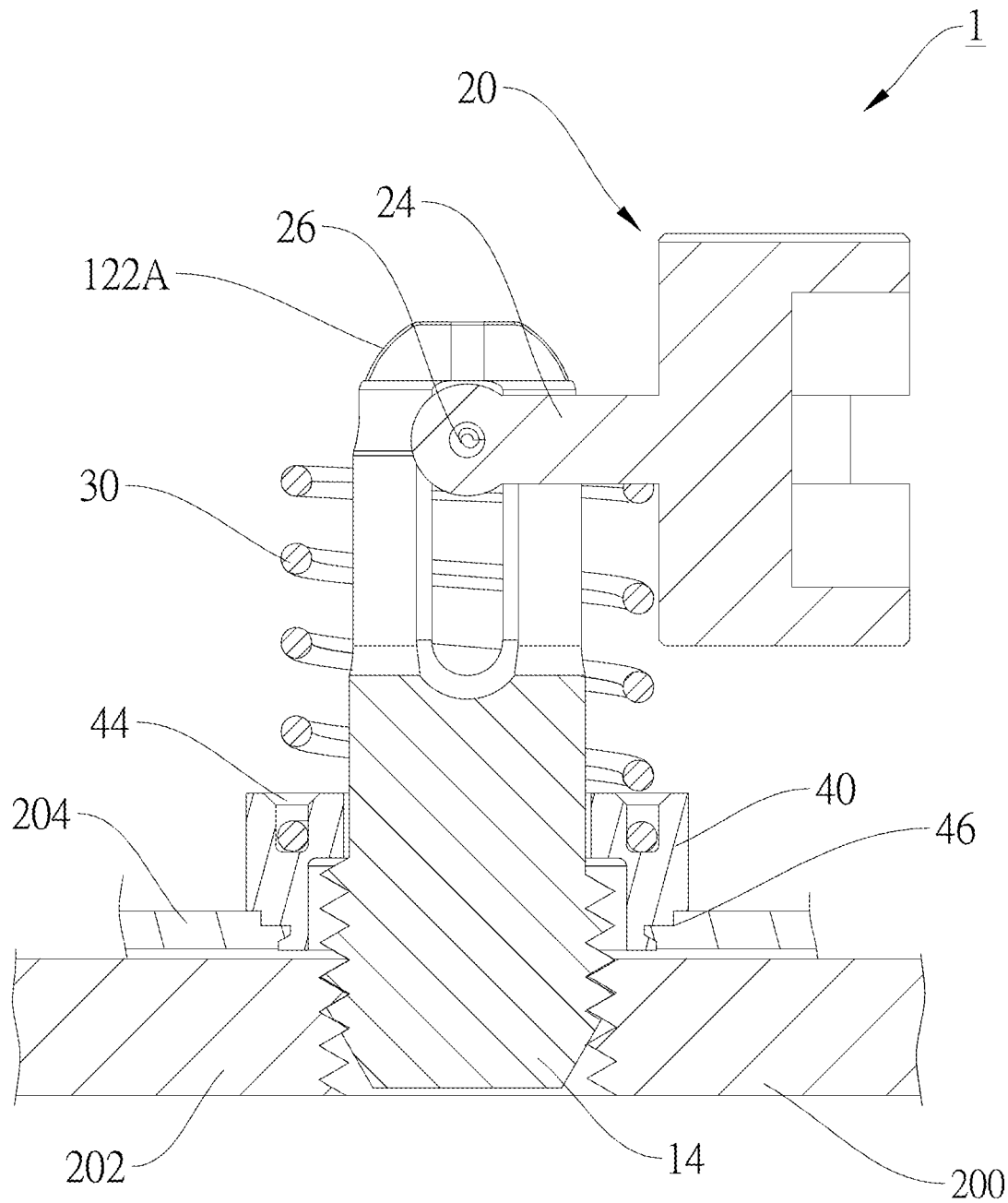
FIG. 9 is a sectional view along the 9-9 line in FIG. 6.

Referring to FIG. 8, when the thumb screw 1 is about to be engaged with the screw hole 202a of the case body 202, a user could press the rotating member 20 in a direction towards the case body 202, making the rod 24 move along the groove 122 in the direction towards the case body 202 and making the two pin portions 26 move along the two guiding holes 124 in the direction towards the case body 202. Simultaneously, the spring 30 is compressed until the rod 24 is located at a predetermined position in the groove 122, and the two partial end portions 122B, 122C are respectively received in the two receiving grooves 222 of the head 22. At that time, the two partial end portions 122B, 122C are respectively engaged with the two receiving grooves 222 of the head 22, so that when the rotating member 20 is rotated, each of the two partial end portions 122B, 122C abuts against a groove wall of one of the two receiving grooves 222 of the head 22, and the main body 10 could be driven to rotate, thereby engaging the threaded portion 14 with the screw hole 202a of the case body 202 to fix the circuit board rack 204 on the case body 202. When the user stops pressing the rotating member 20, the spring 30 urges the two pin portions 26 again to make the rotating member 20 move in a direction away from the case body 202, making the two partial end portions 122B, 122C leave the two receiving grooves 222 of the head 22. Referring to FIG. 6 and FIG. 9, at that time, the rotating member 20 could pivot around the two pin portions 26 relative to the main body 10.

As shown in FIG. 5 and FIG. 6, the case 200 of the electronic device has a receiving groove 208 formed between the circuit board rack 204 and the case body 202, so that after the thumb screw 1 is engaged with the screw hole 202a of the case body 202, the rotating member 20 of the thumb screw 1 exposes out of the receiving groove 208 of the case 200 of the electronic device, and the main body 10, the spring 30, and the fixing ring 40 of the thumb screw 1 are located in the receiving groove 208 of the case 200 of the electronic device. Referring to FIG. 6, at that time, the rotating member 20 could be pivoted around the two pin portions 26 in 90 degrees. In other words, the thumb screw 1 which was originally a straight rod, could be turned to a L-shape, so that a height of the thumb screw 1 exposed relative to the case body 202 could be reduced. Besides, collisions between the thumb screw 1 and external objects could be prevented and an appearance of the object could be improved when the rotating member 20 is received in the receiving groove 208 of the case 200 of the electronic device.

Apart from the embodiment of the present disclosure mentioned above, a thumb screw 1 according to another embodiment of the present disclosure only includes the main body 10 and the rotating member 20 that are the same as the structures of the embodiment shown in FIG. 1 to FIG. 3, and the spring 30 and the fixing ring 40 are omitted, which also realizes the primary objective of the present disclosure.

Alternatively, in another embodiment, a thumb screw 1 of the present disclosure only includes the main body 10, the rotating member 20, and the spring 30 that are the same as the structures of the embodiment shown in FIG. 1 to FIG. 3, and the fixing ring 40 is omitted, which also realizes the primary objective of the present disclosure. Or, in still another embodiment, a thumb screw 1 of the present disclosure only includes the main body 10, the rotating member 20, and the fixing ring 40 that are the same as the structures of the embodiment shown in FIG. 1 to FIG. 3, and the spring 30 is omitted, which also realizes the primary objective of the present disclosure.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A thumb screw, comprising:
   a main body having a shank and a threaded portion which are connected together along an axis of the main body, wherein the shank has a groove and a pair of guiding holes; the groove opens at an end portion of the shank and divides the end portion into two partial end portions; the two guiding holes are respectively located on two sides of the groove and communicate with the groove; and
   a rotating member having a head, a rod connected to an end surface of the head, and two pin portions connected to the rod, wherein the head has two receiving grooves respectively located on two sides of the rod; the rod is disposed in the groove and reciprocates along the groove; when the rod is located at a predetermined position in the groove, the two partial end portions are respectively received in the two receiving grooves; when the two pin portions are respectively located in the two guiding holes and the two partial end portions leave the two receiving grooves, the rotating member is pivotable around the two pin portions relative to the main body.

2. The thumb screw as claimed in claim 1, further comprising a spring fitting around the main body; an end of the spring abuts against the two pin portions.

3. The thumb screw as claimed in claim 2, wherein an inner diameter of the spring is smaller than an outer diameter of the threaded portion, and another end of the spring abuts against the threaded portion.

4. The thumb screw as claimed in claim 3, wherein the rod has two screw holes, and the two pin portions respectively are a pin rod disposed on two opposite sides on an axis perpendicular to the axis of the main body; each of the pin rods has a threaded section and is correspondingly engaged with one of the screw holes via the threaded section.

5. The thumb screw as claimed in claim 4, wherein an end of the rod away from the head forms a spherical head; the two screw holes are disposed on the spherical head.

6. The thumb screw as claimed in claim 2, wherein the rod has two screw holes, and the two pin portions respectively are a pin rod disposed on two opposite sides on an axis perpendicular to the axis of the main body; each of the pin rods has a threaded section and is correspondingly engaged with one of the screw holes via the threaded section.

7. The thumb screw as claimed in claim 6, wherein an end of the rod away from the head forms a spherical head; the two screw holes are disposed on the spherical head.

8. The thumb screw as claimed in claim 1, further comprising a fixing ring that has a through hole, wherein the through hole fits around the shank of the main body, thereby positioning the fixing ring between the rotating member and the threaded portion; a diameter of the through hole is smaller than an outer diameter of the threaded portion.

9. The thumb screw as claimed in claim 8, further comprising a spring fitting around the main body, wherein two ends of the spring respectively abut against the two pin portions and the fixing ring.

10. The thumb screw as claimed in claim 9, wherein the fixing ring has an end facing the spring; the end of the fixing ring has an annular positioning groove adapted to receive and position one of the two ends of the spring that abuts against the fixing ring.

11. The thumb screw as claimed in claim 9, wherein the rod has two screw holes, and the two pin portions respectively are a pin rod disposed on two opposite sides on an axis perpendicular to the axis of the main body; each of the pin rods has a threaded section and is correspondingly engaged with one of the screw holes via the threaded section.

12. The thumb screw as claimed in claim 11, wherein an end of the rod away from the head forms a spherical head; the two screw holes are disposed on the spherical head.

13. The thumb screw as claimed in claim 8, wherein the fixing ring has an engaging portion surrounding an outer peripheral wall of the fixing ring.

14. The thumb screw as claimed in claim 1, wherein the rod has two screw holes, and the two pin portions respectively are a pin rod disposed on two opposite sides on an axis perpendicular to the axis of the main body; each of the pin rods has a threaded section and is correspondingly engaged with one of the screw holes via the threaded section.

15. The thumb screw as claimed in claim 14, wherein an end of the rod away from the head forms a spherical head; the two screw holes are disposed on the spherical head.

* * * * *